United States Patent [19]

Choi et al.

[11] Patent Number: 5,461,522
[45] Date of Patent: Oct. 24, 1995

[54] HOUSING APPARATUS FOR A TAPE RECORDER AND WHICH INCLUDES A SLIDABLE CASSETTE HOLDER POSITIONED ON A PLATE MEMBER VIA A LEVER MEMBER

[75] Inventors: Do Y. Choi; Jae K. Seo, both of Suwon, Rep. of Korea

[73] Assignee: Samsung Electronics Co., Ltd., Kyungki, Rep. of Korea

[21] Appl. No.: 168,417

[22] Filed: Dec. 17, 1993

[30] Foreign Application Priority Data

Dec. 17, 1992 [KR] Rep. of Korea ............... 1992-24590
Dec. 17, 1992 [KR] Rep. of Korea ............... 1992-24591

[51] Int. Cl.$^6$ ............................................. G11B 15/00
[52] U.S. Cl. ............................................. 360/96.6
[58] Field of Search .................. 360/92, 96.5, 96.6; 242/338.4, 339

[56] References Cited

U.S. PATENT DOCUMENTS

| | | | |
|---|---|---|---|
| 4,794,478 | 12/1988 | Kamezawa et al. | 360/96.5 |
| 4,866,550 | 9/1989 | Ohashi et al. | 360/94 |
| 4,954,916 | 9/1990 | Tobimatsu | 360/96.5 |
| 5,124,854 | 6/1992 | Iyota et al. | 360/96.6 |
| 5,175,656 | 12/1992 | Nakatsukasa et al. | 360/96.6 |
| 5,390,055 | 2/1995 | Machara et al. | 360/96.5 |

FOREIGN PATENT DOCUMENTS

| | | | |
|---|---|---|---|
| 0249958 | 10/1988 | Japan | 360/96.6 |
| 0198158 | 4/1989 | Japan | 360/96.6 |
| 2292771 | 12/1990 | Japan | 360/96.6 |
| 4049564 | 2/1992 | Japan | 360/96.6 |
| 9321631 | 10/1993 | WIPO | 360/96.6 |

Primary Examiner—Robert S. Tupper
Assistant Examiner—Brian E. Miller
Attorney, Agent, or Firm—Sughrue, Mion, Zinn, Macpeak & Seas

[57] ABSTRACT

A housing apparatus of a tape recorder for recording or reproducing signals on a tape transferred along a certain travelling path and including a main deck having a travelling system, a lever member hingedly coupled with one side of the main deck, a plate member vertically moved up and down on the main deck by the lever member, and a cassette holder horizontally moved on the plate member, so that when the lever member is rotated up and down, a side gear mounted on the plate member is brought into meshing engagement with a rack gear positioned on the lever member, and the cassette holder positioned on the plate member is slidably moved by an interlocking device connected to the side gear, thereby loading and ejecting the cassette tape. Therefore, the sequential operations of loading and ejecting the cassette tape are smoothly and harmoniously performed without requiring a separate motor or structural devices.

5 Claims, 4 Drawing Sheets

HOUSING APPARATUS FOR A TAPE RECORDER AND WHICH INCLUDES A SLIDABLE CASSETTE HOLDER POSITIONED ON A PLATE MEMBER VIA A LEVER MEMBER

BACKGROUND OF THE INVENTION

1. Field of the Invention

The present invention relates to a tape recorder, and more particularly to a housing apparatus of a tape recorder which can load and eject a cassette tape by slidably moving a cassette holder positioned on a plate member by a lever member which is closed and/or opened by means of a hinge system without using a separate motor.

2. Description of the Related Art

Generally, various constituents in tape recorders required for recording signals on a tape or reproducing the recorded signals therefrom are positioned on either one deck or a sub-deck has a problem in that it is impossible to make a product small since all of the constituents should be positioned on one deck and, therefore, the deck size itself tends to increase. In addition, a recently used tape recorder has constituents being dispersively positioned after separately constituting a deck as a sub-deck and a main deck in order to minimize a product size. However, this kind of a tape recorder also has a limitation in minimizing the product size since the sub-deck moves on the main deck by a predetermined distance to be operated. Moreover, such a tape recorder must use a separate driving motor when loading and ejecting the cassette tape.

On the other hand, as disclosed in Korean Patent Application No. 92-13757, the applicant of this application presented a tape recorder which can be simplified with respect to its structure and miniaturized to be a pocket size by loading and ejecting a tape on a drum positioned on a housing according to the closing and opening of the lever housing after a cassette tape is placed on the housing in the lever housing operated as a hinge on the main deck. However, the tape recorder as mentioned above has problems in that a cassette tape can be safely mounted on the main deck only by pressing and closing the lever housing after primarily loading the cassette tape on the housing, and the tape should be completely loaded on the drum since the loading apparatus can be operated by a separate driving motor. That is, this tape recorder has drawbacks in that its construction is complicated and its structural operation is not easy.

SUMMARY OF THE INVENTION

An object of the present invention, while considering the above problems, is to provide a housing apparatus of a tape recorder in which a cassette tape is successively loaded and ejected during operation of a lever member in an up and down movement, thereby easily and smoothly operating the housing apparatus using a simple construction.

The present invention achieves such an object by providing a housing apparatus of a tape recorder for recording or reproducing signals on a tape transferred along a certain travelling path. The housing apparatus includes a main deck having a travel system, a lever member hinge-coupled with one side of the main deck, a plate member vertically movable up and down on the main deck by the lever member, and a cassette holder horizontally movable on the plate member. Therefore, if the lever member is pivoted or rotated up and down, a side gear mounted on the plate member is brought into meshing engagement with a rack gear formed at the lever member, and a cassette holder positioned on the plate member is slidably moved by an interlocking device connected to the side gear, thereby loading and ejecting the cassette tape.

Preferably, in the housing apparatus of the tape recorder according to the present invention, the loading and ejecting operations of the cassette tape on the plate member and the up and down pivoting or rotating operations of the lever member are sequentially performed by the up and down swinging of the lever member.

DETAILED DESCRIPTION OF THE PREFERRED EMBODIMENT

An embodiment of a housing apparatus of a tape recording according to the present invention will be explained in detail with reference to the attached drawings.

FIGS. 1 through 5 schematically illustrate the housing apparatus according to the present invention. The housing apparatus includes a main deck 10 having various constituents such as a reel (not shown) for a tape travelling operation, a lever member 20 which is hinge-coupled to one side of the main deck 10 and pivots up and down, a or plate member 30 positioned between the main deck 10, the lever member 20 to be operated up and down, and a cassette holder 40 which horizontally moves along the plate member 30.

Figure 3A:
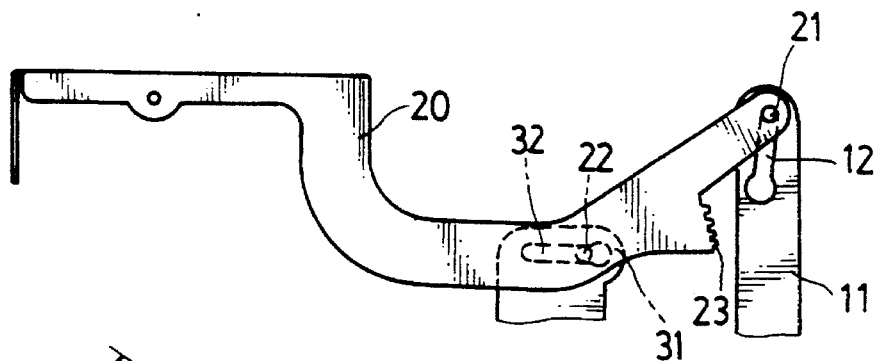
FIGS. 3A, 3B and 3C are segmentary views of principal portions for illustrating an operational status of the lever member in the apparatus shown in FIG. 1.
Figure 3B:
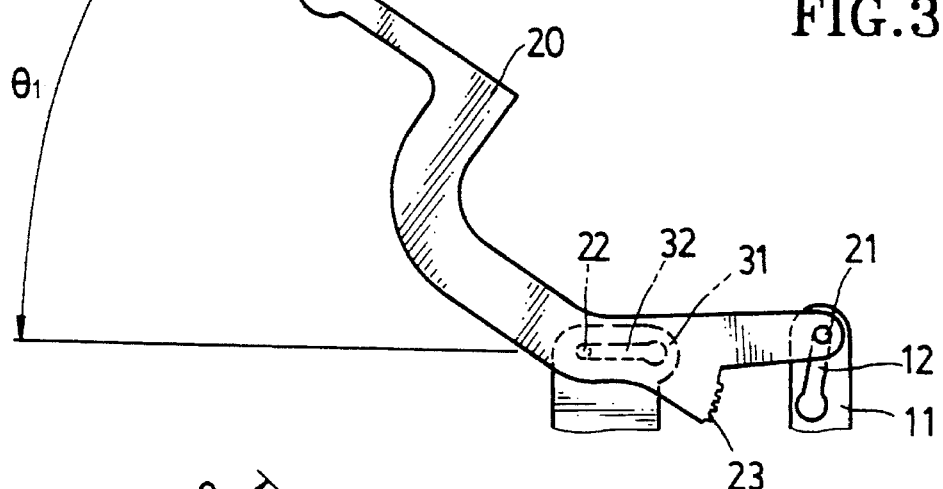
Figure 3C:
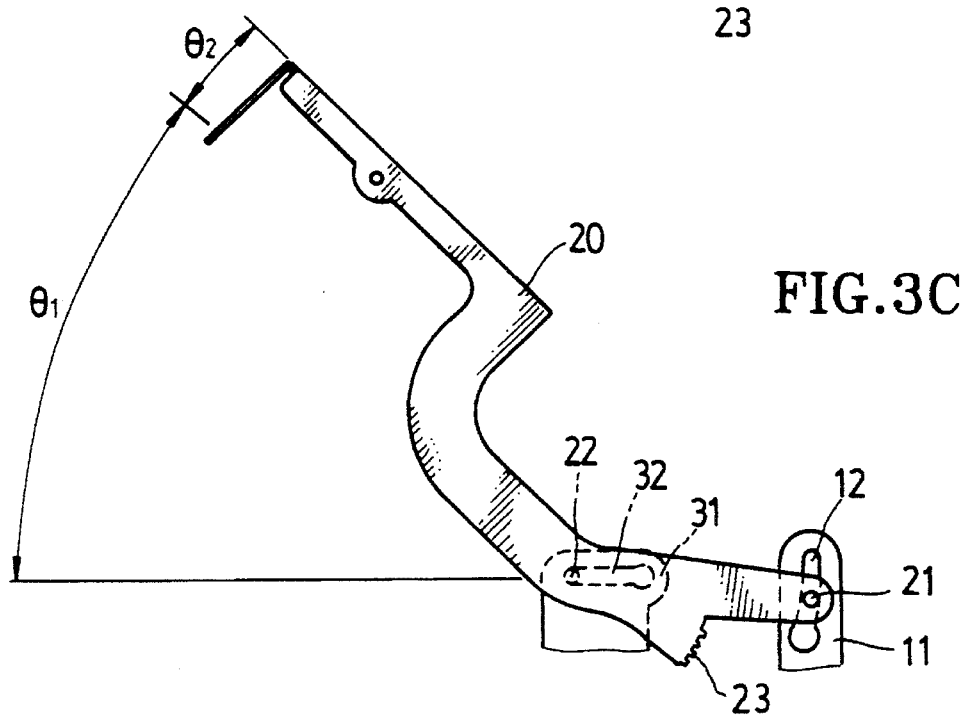

Further, an upwardly projecting bracket 11 is positioned on one side of the main deck 10. A slot 12 having a small circular arc is formed in a vertical direction in the upper portion of the bracket 11, and another slot 32 is formed in a horizontal direction in a bracket 31 formed on one side of the plate member 30, so that first and second pins 21 and 22, respectively projecting on one side of the lever member 20, are inserted to be coupled with the respective slots, as shown in FIGS. 3A through 3C.

A rack gear 23 is positioned on the end of the lever member 20 to be brought into meshing engagement with a side gear 33 mounted on the side of the plate member 30. When the side gear 33 is rotated, the cassette holder 40 positioned on the upper portion of the plate member 30 is inwardly loaded or ejected by an interlocking device 300.

The interlocking device 300 comprises a sector gear 36 installed on the upper side of the housing to swing by means of a bevel gear 34 coaxially formed with the side gear 33, and the slide lever 39 rotated in a meshing engagement with the sector gear 36.

Figure 4A:
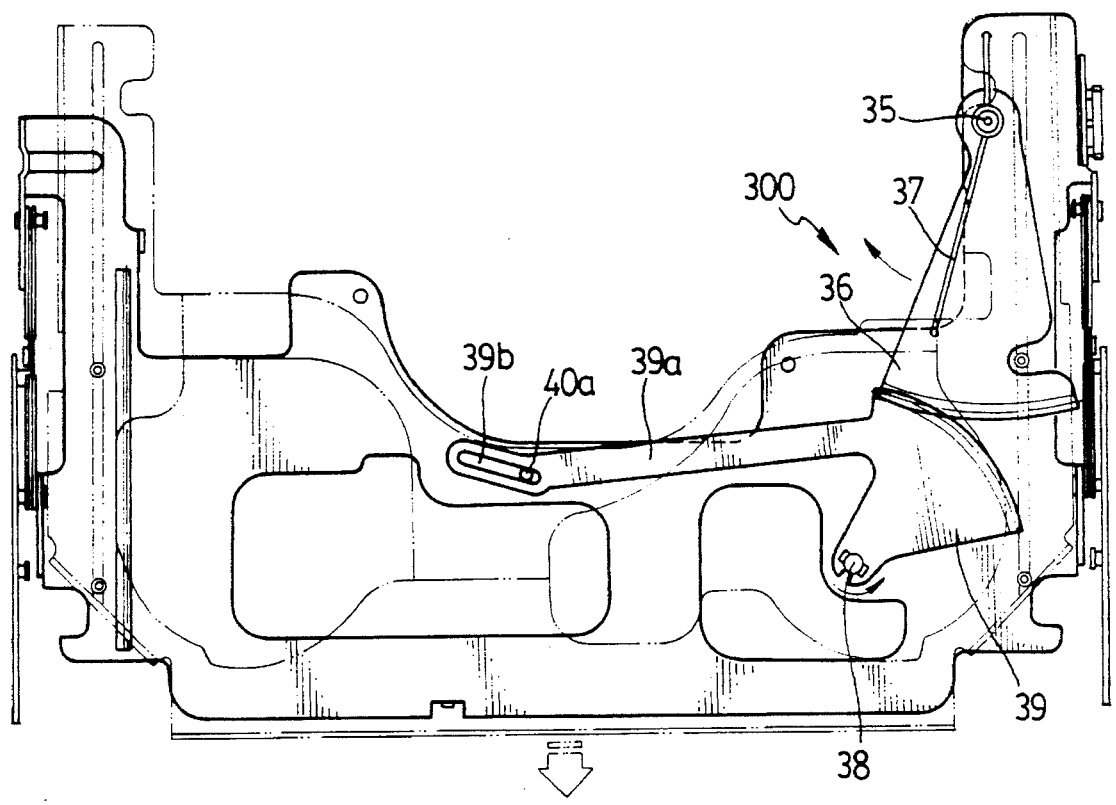
FIGS. 4A and 4B are plan views illustrating an operational status of the housing apparatus of the tape recorder according to the present invention.
Figure 5:
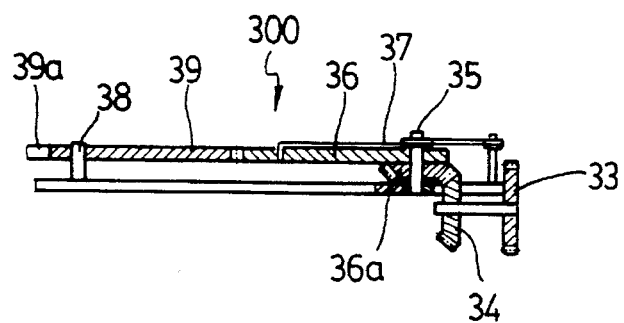
FIG. 5 is a segmentary side view illustrating principal portions of FIG. 4A.
Figure 4B:
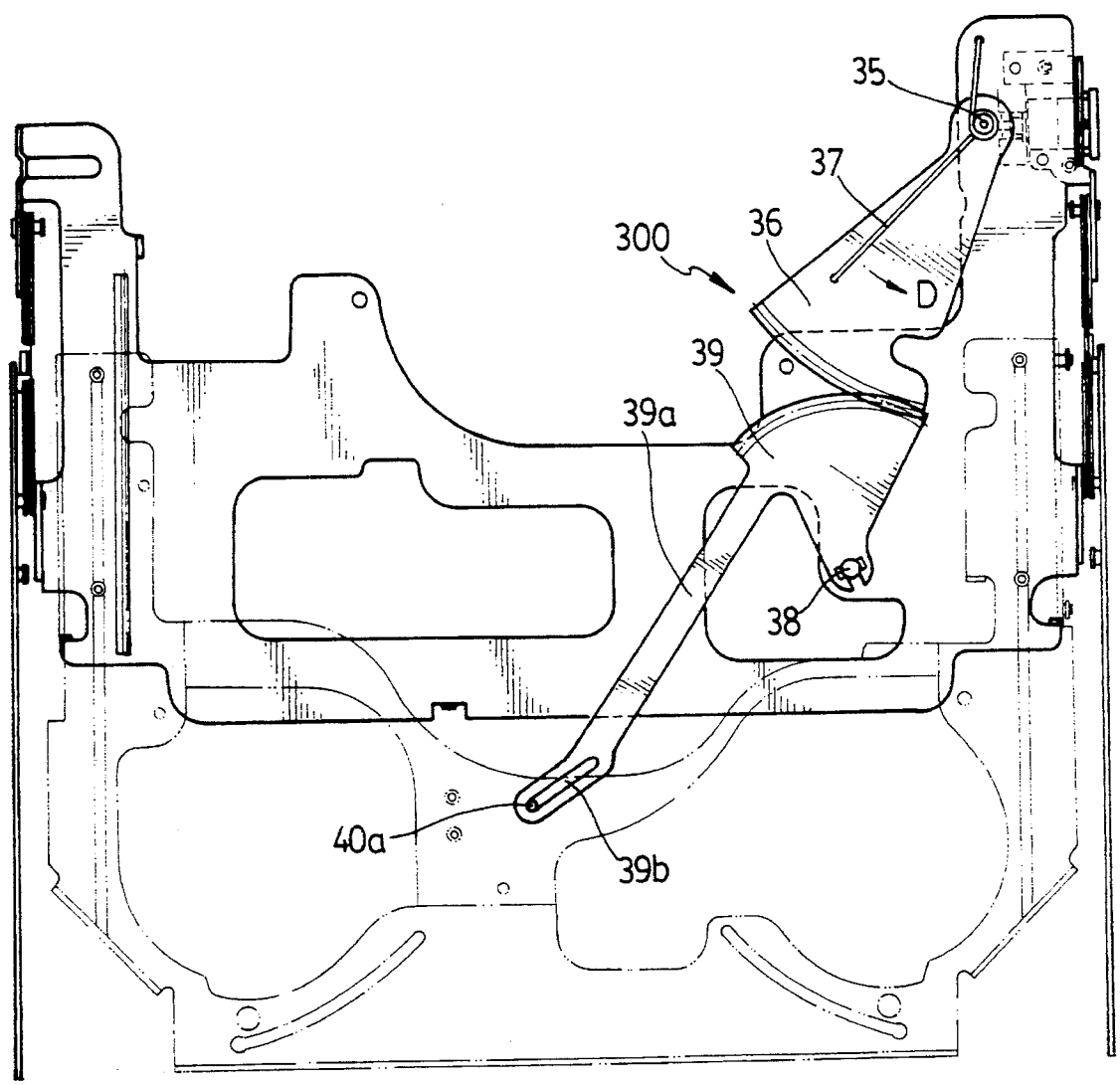

As shown in FIGS. 4A, 4B and 5, the interlocking device 300 is operated by the side gear 33 which is mounted on the side of the plate member 30 and is brought into meshing engagement with a bevel gear 36a, disposed on the lower portion of the sector gear 36, through the bevel gear 34 which is coaxially formed with the side gear 33, so that the sector gear 36 rotates or pivots around the center of a pin 35 on the plate member 30. Also, a torsion spring 37, which is hung on both the sector gear 36 and the plate member 30, is mounted on the pin 35.

The slide lever 39, which swings around a pin 38 on the plate member 30, is brought into meshing engagement with the sector gear 36. A slot 39b is formed at the end of an arm 39a formed on one side of the slide lever 39 facing an appropriate center of the housing apparatus, and a pin 40a projecting from the cassette holder 40 is inserted and fitted to the arm 39a.

Slots 10b and 30b are formed in bending pieces 10a and 30a formed on the sides of the main deck 10 and the plate member 30, respectively, so that first sides of respective first and second links 51 and 52, provided as an X-shape around and axis 50, are connected to respective bending pieces 10a and 30a. Second sides of the respective first and second links 51 and 52 are connected with the plate member 30 and the main deck 10 so as to swing, so that a predetermined elasticity is applied by means of a torsion spring 53.

Figure 1:
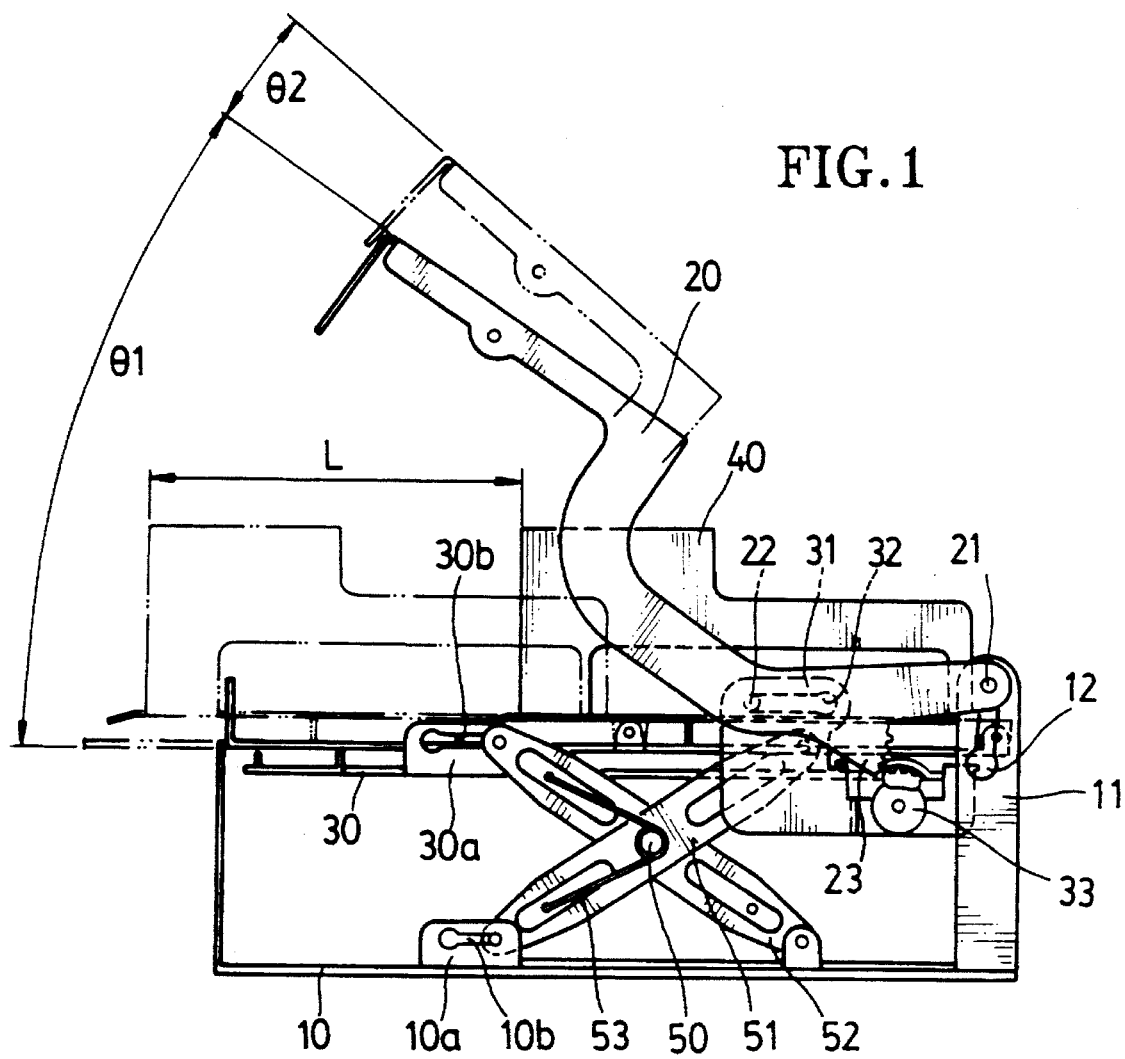
FIG. 1 is a schematic side view illustrating a housing apparatus of a tape recorder according to the present invention.
Figure 2:
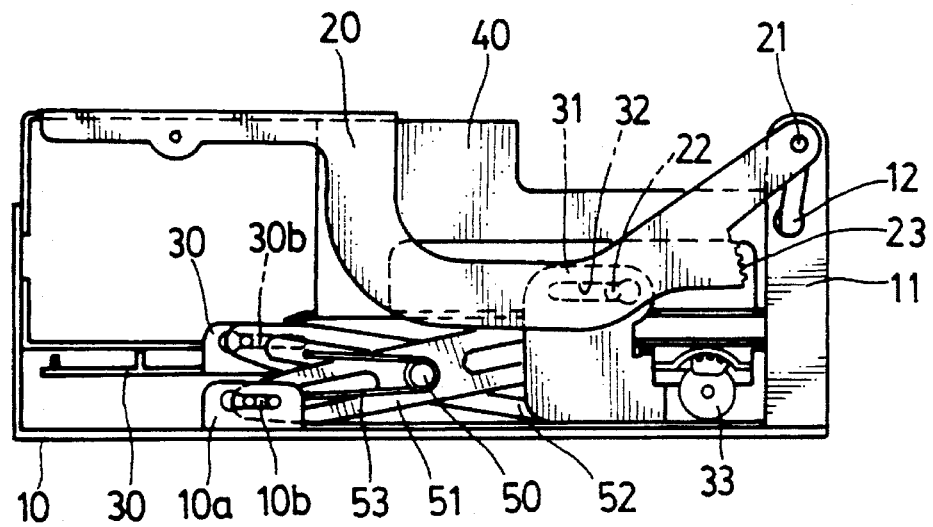
FIG. 2 is a schematic side view illustrating the status wherein the apparatus shown in FIG. 1 is safely mounted on the deck.

According to the present invention, with the construction as specified above, the plate member 30 is elevated by an elasticity of the torsion spring 53 positioned at the first and second links 51 and 52 as a locking device (not shown) is released under the state wherein the plate member 30 is safely mounted to the main deck 10 as shown in FIG. 2. At this time, as shown in FIGS. 1 and 3B, the lever member 20 is also raised as much as $\theta_1$ by a force exerted thereupon, and inclined to be raised further; but it cannot be raised any more since the first pin 21 of the lever member 20 abuts against the end of the slot 12 of the main deck 10, and the second pin 22 of the lever plate member 20 is interlocked with the housing 30 to be continuously raised.

That is, while the plate member 30 is moved up by the first and second links 51 and 52, the lever member 20 is rotated as much as $\theta_1$ by utilizing the first pin 21 as a hinge point. In this state, the lever member 20 is moved up as much as $\theta_2$ as indicated by a broken line in FIG. 1, in which the rack gear 23 positioned on one end of the lever member 20 rotates the side gear 33 mounted on the plate member 30, and therefore the rotation force of the side gear 33 is transferred to the sector gear 36 through the bevel gears 34 and 36a.

Accordingly, under the state that the cassette holder 40 is placed on the plate member 30, as shown in FIG. 4A, if the sector gear 36 elastically rotates clockwise around the pin 35 by the torsion spring 37, the slide lever 39 rotates counter-clockwise around the pin 38, so that the arm 39a formed on the slide lever 39 moves as shown in FIG. 4B to thereby eject the cassette holder 40 outside the plate member 30.

Thus, the cassette holder 40 for housing the cassette tape is moved by a predetermined distance as much as L within the virtual line (see FIG. 1) and, simultaneously, the cassette tape is easily ejected.

Herein, although a one-side force and a moment force occur in the lever member 20 which is in meshing engagement with the side gear 33 via the rack gear 23, as the second pin 22 of the lever member 20 is guided at the side of the slot 32 of the plate member 30, the one-side force parallels with a reacting force and then lapses. Therefore, since the lever member 20 rotates the first pin 21 of the lever member 20 connected with the slot 12 of the main deck 10 by using the second pin 22 as a hinge point, the lever member 20 rotates further by as much as $\theta_2$ as shown in FIG. 3C, thereby ejecting the cassette holder 40.

However, when the cassette tape is to be safely mounted, the cassette tape is inserted into the cassette holder 40 and the lever member 20 is operated to move downwardly through an angle of $\theta_2$. By this operation, in contrast with the process for ejecting, the cassette holder 40 is moved inwardly on the plate member 30, thereby completing the loading. By descending in further by as much as $\theta_1$, the cassette tape can be safely mounted on the main deck 10.

As seen from the above, the housing apparatus according to the present invention is more smoothly and harmoniously operated without using a separate motor, by sequentially loading and ejecting the cassette tape while using the lever member which is opened or closed in a hinge-like manner.

It is contemplated that numerous modifications may be made to the housing apparatus of the present invention without departing from the spirit and scope of the invention as defined in the following claims.

What is claimed is:

1. A housing apparatus of a tape recorder for recording and reproducing signals on a cassette tape transferred along a travelling path, said housing apparatus comprising:

a main deck;

a lever member hingedly coupled with one side of said main deck and pivotable with respect to said main deck, said lever member including a rack gear;

a plate member mounted for vertical movement up and down on said main deck by means of said lever member, said plate member including a side gear mounted thereon;

a cassette holder mounted for horizontal movement on said plate member; and an interlocking means connected between said side gear and said cassette holder, whereby, when said lever member is pivoted up and down, said side gear mounted on said plate member is brought into meshing engagement with said rack gear positioned on said lever member, and said cassette holder positioned on said plate member is slidably moved by said interlocking means connected to said side gear, thereby being operative to load and eject said cassette tape.

2. The housing apparatus of a tape recorder according to claim 1, further comprising slots formed in one end of said main deck and said plate member, respectively; and first and second pins formed on said lever member and respectively inserted in said slots.

3. The housing apparatus of a tape recorder according to claim 2, wherein said slots formed in said main deck and said plate member are substantially perpendicular to each other.

4. The housing apparatus of a tape recorder according to claim 1, wherein said interlocking means comprises a sector gear pivotally mounted on a first pin installed on an upper side of said plate member to swing by means of a bevel gear coaxially formed with said side gear; and a slide lever rotated in a meshing engagement with said sector gear, one end of which has a slot to be inserted with a second pin positioned on said cassette holder.

5. The housing apparatus of a tape recorder according to claim 4, wherein a tensile force is applied to said sector gear around a center of said first pin by a torsion spring of which one end is fixed on said plate member.

* * * * *